US012711750B2

(12) United States Patent
Neill et al.

(10) Patent No.: US 12,711,750 B2
(45) Date of Patent: Aug. 18, 2026

(54) SYSTEMS AND METHODS FOR CLASSIFICATION OF AMBIGUOUS OBJECTS

(71) Applicant: Tyco Fire & Security GmbH, Neuhausen am Rheinfall (CH)

(72) Inventors: Terence Neill, Lisburn (GB); William Thomas Calvert, Belfast (GB); Peter Lawrence, Lisburn (GB)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 466 days.

(21) Appl. No.: 18/320,052

(22) Filed: May 18, 2023

(65) Prior Publication Data

US 2024/0386708 A1 Nov. 21, 2024

(51) Int. Cl.
*G06V 10/776* (2022.01)
*G06V 10/26* (2022.01)
*G06V 10/764* (2022.01)

(52) U.S. Cl.
CPC ............ *G06V 10/776* (2022.01); *G06V 10/26* (2022.01); *G06V 10/764* (2022.01)

(58) Field of Classification Search
None
See application file for complete search history.

(56) References Cited

U.S. PATENT DOCUMENTS 6,793,128 B2 9/2004 Huffman
2012/0027285 A1 2/2012 Shlain et al.
2014/0214568 A1 7/2014 Argue et al.
(Continued)

FOREIGN PATENT DOCUMENTS

CN 107590489 * 1/2018
CN 107590489 A 1/2018
(Continued)

OTHER PUBLICATIONS

Guo et al., "Cascaded convolutional neural networks for object detection", DOI: 10.1109/VCIP.2017.8305026, Published Year: 2017 (Year: 2017).*
(Continued)

*Primary Examiner* — Chan S Park
*Assistant Examiner* — Promotto Tajrian Islam
(74) *Attorney, Agent, or Firm* — ArentFox Schiff LLP

(57) ABSTRACT

Example implementations include a method, apparatus and computer-readable medium for object classification, including executing a multi-class object classification model (OCM) on an input image depicting an object, wherein the multi-class OCM is configured to output, for each respective class of a plurality of classes, a respective confidence score indicative of a likelihood of the object being of a member the respective class. The implementations further include detecting a plurality of confidence scores outputted by the multi-class OCM that are within a threshold range, wherein classes associated with the plurality of confidence scores are candidate classes of the object. Additionally, the implementations further include executing, on the input image, a single-class OCM for each of the candidate classes and outputting a final class for the object in the input image based on a result of each single-class OCM.

15 Claims, 7 Drawing Sheets

300

(56) References Cited

U.S. PATENT DOCUMENTS

| | | | | |
|---|---|---|---|---|
| 2014/0254890 | A1 | 9/2014 | Bergman et al. | |
| 2015/0199575 | A1 | 7/2015 | Dudovich | |
| 2016/0217349 | A1 * | 7/2016 | Hua | G06N 20/00 |
| 2019/0108405 | A1 | 4/2019 | Xu | |
| 2019/0122381 | A1 * | 4/2019 | Long | G06V 10/96 |
| 2020/0057885 | A1 | 2/2020 | Rao et al. | |
| 2020/0193218 | A1 * | 6/2020 | Liu | G06V 10/955 |
| 2020/0285910 | A1 * | 9/2020 | Steelberg | G06F 18/285 |
| 2021/0407264 | A1 | 12/2021 | Kawano et al. | |
| 2022/0391484 | A1 | 12/2022 | Weston et al. | |
| 2024/0193968 | A1 * | 6/2024 | Elan | G01N 15/1433 |

FOREIGN PATENT DOCUMENTS

| | | | | |
|---|---|---|---|---|
| WO | 2020247596 | A1 | 12/2020 | |
| WO | WO-2024134083 | A1 * | 6/2024 | G06V 10/7753 |

OTHER PUBLICATIONS

Anonymous., "Multiclass classification—Wikipedia", Available on internet at: <https://en.wikipedia.org/w/index.php?title=Multiclass_classification&oldid=1145868961>, XP093207039, Mar. 21, 2023, 5 pages.

Kuncheva L., "Ch.5 Combining Continuous-Valued Ourputs—sec 5.3 Nontrainable (Fixed) Combination Rules; Ch. 7 Classifier Selection—sec 7.6 Cascade Classifiers", Methods and Algorithms, Wiley & Sons, Incorporated, XP093207160, Feb. 2, 2014, 21 pages.

Extended European Search Report issued in corresponding European Application No. 24176614.6-1207 dated Oct. 2, 2024.

* cited by examiner

500

Generating, by the multi-class OCM, a boundary around each classified object of the plurality of objects in the input image

602

Extracting an image of the object from the input image based on a generated boundary around the object, wherein each single-class OCM is executed on the image extracted

604

SYSTEMS AND METHODS FOR CLASSIFICATION OF AMBIGUOUS OBJECTS

TECHNICAL FIELD

The described aspects relate to object classification systems.

BACKGROUND

Aspects of the present disclosure relate generally to object classification systems, and more particularly, to classification of ambiguous objects.

A typical object classification model tends to be generalist in nature such that it is required to detect a multitude of different objects. For example, an object classification model employed in self-driving cars needs to identify cars, buses, people, bicycles, etc., in order to make decisions for driving. Because there are multiple classes to consider, the object classification model may incorrectly mix up classes (e.g., classify a car as a train).

This is frustrating to users of object classification, limits the usefulness of the analytics for practical purposes, and causes a loss of confidence in the capability of such analytics. The problem is further exacerbated by the limited compute power available in edge analytics applications.

Conventional object classification systems are unable to address these issues. Accordingly, there exists a need for improvements in such object classification systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for object classification, comprising executing a multi-class object classification model (OCM) on an input image depicting an object, wherein the multi-class OCM is configured to output, for each respective class of a plurality of classes, a respective confidence score indicative of a likelihood of the object being of a member the respective class. The method further includes detecting a plurality of confidence scores outputted by the multi-class OCM that are within a threshold range, wherein classes associated with the plurality of confidence scores are candidate classes of the object. Additionally, the method further includes executing, on the input image, a single-class OCM for each of the candidate classes, wherein the single-class OCM is configured to determine whether a given object is a member of a specific candidate class of the candidate classes. Additionally, the method further includes outputting a final class for the object in the input image based on a result of each single-class OCM.

Another example aspect includes an apparatus for object classification, comprising a memory and a processor coupled with the memory. The processor is configured to execute a multi-class object classification model (OCM) on an input image depicting an object, wherein the multi-class OCM is configured to output, for each respective class of a plurality of classes, a respective confidence score indicative of a likelihood of the object being of a member the respective class. The processor is further configured to detect a plurality of confidence scores outputted by the multi-class OCM that are within a threshold range, wherein classes associated with the plurality of confidence scores are candidate classes of the object. Additionally, the processor further configured to execute, on the input image, a single-class OCM for each of the candidate classes, wherein the single-class OCM is configured to determine whether a given object is a member of a specific candidate class of the candidate classes. Additionally, the processor further configured to output a final class for the object in the input image based on a result of each single-class OCM.

Another example aspect includes an apparatus for object classification, comprising means for executing a multi-class object classification model (OCM) on an input image depicting an object, wherein the multi-class OCM is configured to output, for each respective class of a plurality of classes, a respective confidence score indicative of a likelihood of the object being of a member the respective class. The apparatus further includes means for detecting a plurality of confidence scores outputted by the multi-class OCM that are within a threshold range, wherein classes associated with the plurality of confidence scores are candidate classes of the object. Additionally, the apparatus further includes means for executing, on the input image, a single-class OCM for each of the candidate classes, wherein the single-class OCM is configured to determine whether a given object is a member of a specific candidate class of the candidate classes. Additionally, the apparatus further includes means for outputting a final class for the object in the input image based on a result of each single-class OCM.

Another example aspect includes a computer-readable medium having instructions stored thereon for object classification, wherein the instructions are executable by a processor to execute a multi-class object classification model (OCM) on an input image depicting an object, wherein the multi-class OCM is configured to output, for each respective class of a plurality of classes, a respective confidence score indicative of a likelihood of the object being of a member the respective class. The instructions are further executable to detect a plurality of confidence scores outputted by the multi-class OCM that are within a threshold range, wherein classes associated with the plurality of confidence scores are candidate classes of the object. Additionally, the instructions are further executable to execute, on the input image, a single-class OCM for each of the candidate classes, wherein the single-class OCM is configured to determine whether a given object is a member of a specific candidate class of the candidate classes. Additionally, the instructions are further executable to output a final class for the object in the input image based on a result of each single-class OCM.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses, methods, and computer-readable media that provide improved object classification for ambiguous objects. The aspects described herein utilize a general object classification model (OCM) to determine a candidate class for an object. If there are multiple candidate classes for the object, that object is identified as an ambiguous object. Accordingly, two or more single-class OCMs are used to determine the true class of the ambiguous object. For example, if the general OCM determines than the ambiguous object may be a car or a train, an OCM specifically trained to detect cars is executed in addition to an OCM specifically trained to detect trains. Based on the results from each of these models, a final class is assigned. For example, if the car-specific classification model determines that the ambiguous object is not a car and the train-specific classification model determines that the ambiguous object is a train, the apparatus and methods of the present disclosure determine that the final class is "train" for the ambiguous object.

Figure 1:
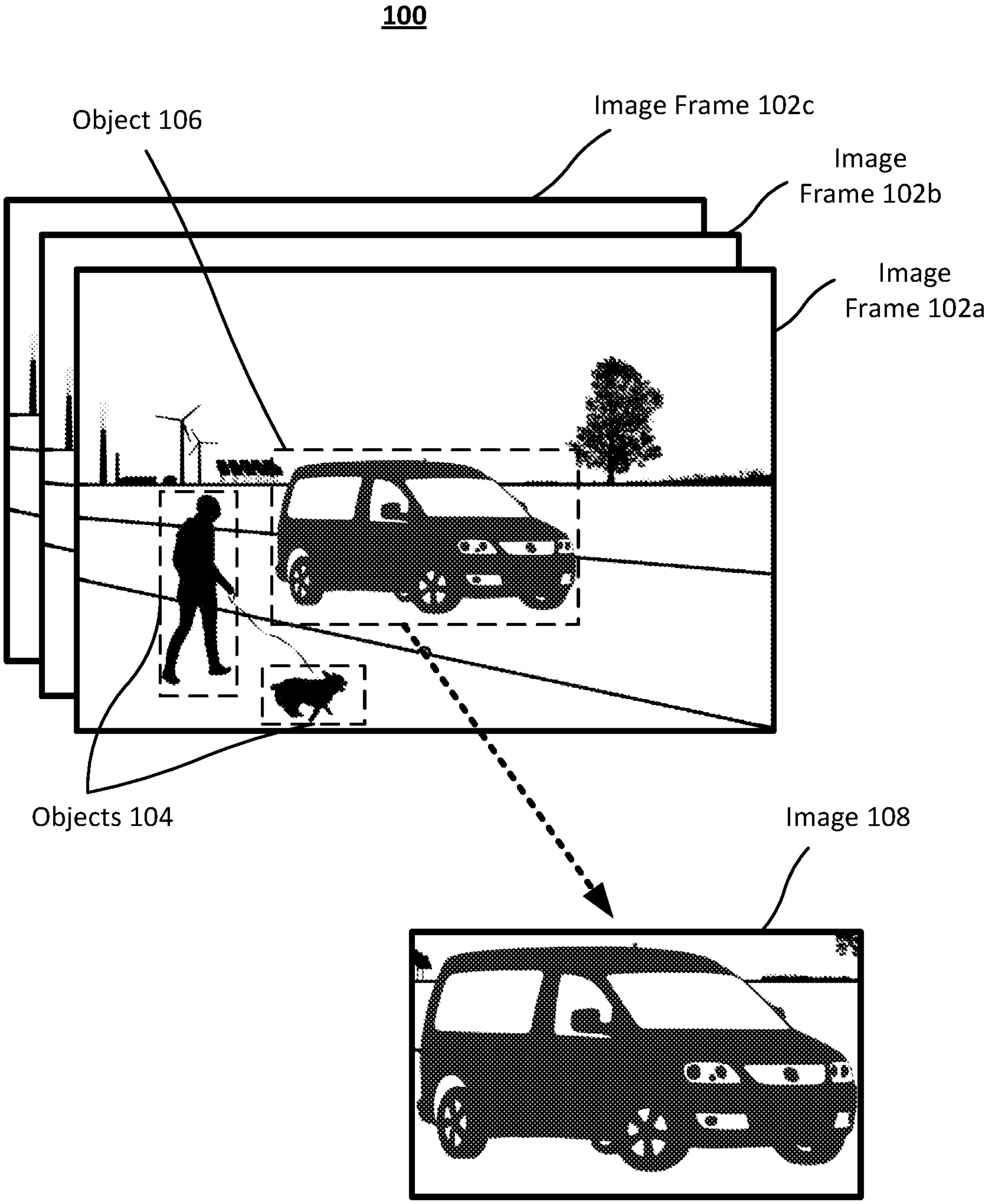
FIG. 1 is a diagram of an input image with classified objects and an extracted image of an ambiguous object, in accordance with exemplary aspects of the present disclosure.

FIG. 1 is a diagram 100 of an input image with classified objects and an extracted image of an ambiguous object, in accordance with exemplary aspects of the present disclosure. Consider an example in which a camera provides a video stream that includes image frames 102*a*, 102*b*, 102*c*, etc. For simplicity only three frames are shown, but one skilled in the art will appreciate that any number of frames may be received. Furthermore, the camera may be a smartphone camera, a security camera, a webcam, a car camera, etc. An object classifier component (described in FIG. 4) may receive each frame and apply classification algorithms to detect and identify objects. More specifically, the object classifier component may include a general OCM that is a multi-class model and a plurality of single-class OCMs that classify solely a particular class from the multi-class set.

Suppose that the multi-class set includes five classes, namely, "train," "car," "bike," "animal," and "person." The general OCM may receive image frame 102*a* and classify objects 104 respectively as "person" and "animal." In some aspects, the classification may further include detecting an object and generating a boundary around the object. In some aspects, the boundary is a shape (e.g., a rectangle) that fully encompasses the object and has a minimum-possible area.

In some aspects, when assigning a class to an object, the general OCM may generate a confidence score, which is a probability (e.g., a likelihood) of the classification being correct. An object is assigned a class by the general OCM when the confidence score exceeds a threshold confidence score. For example, the general OCM may have a confidence score of 90% for each of objects 104. If the threshold confidence score is 80%, then in this example the general OCM will assign the determined classes of "person" and "animal," respectively, as described above. Alternatively, in this example, if the threshold confidence score is 95%, because the confidence scores determined by the general OCM are lower than the threshold confidence score, then the general OCM will consider the objects 104 to be ambiguous and will not assign the objects 104 a class from the multi-class set. In this case, the described aspects will then initiate subsequent evaluation and classification using two or more single-class OCMs in order to determine the true class of the ambiguous objects.

It should be understood that, in other cases, the described aspects may also use the two or more single-class OCMs in order to determine the true class of an ambiguous object when the general OCM determines two or more predicted classes for an object that are above the threshold confidence score.

For example, continuing with the case described above, while the classifications for objects 104 may be correct, the general OCM may classify object 106 incorrectly. For example, object 106 is a car, but may be classified as a train.

Figure 2:
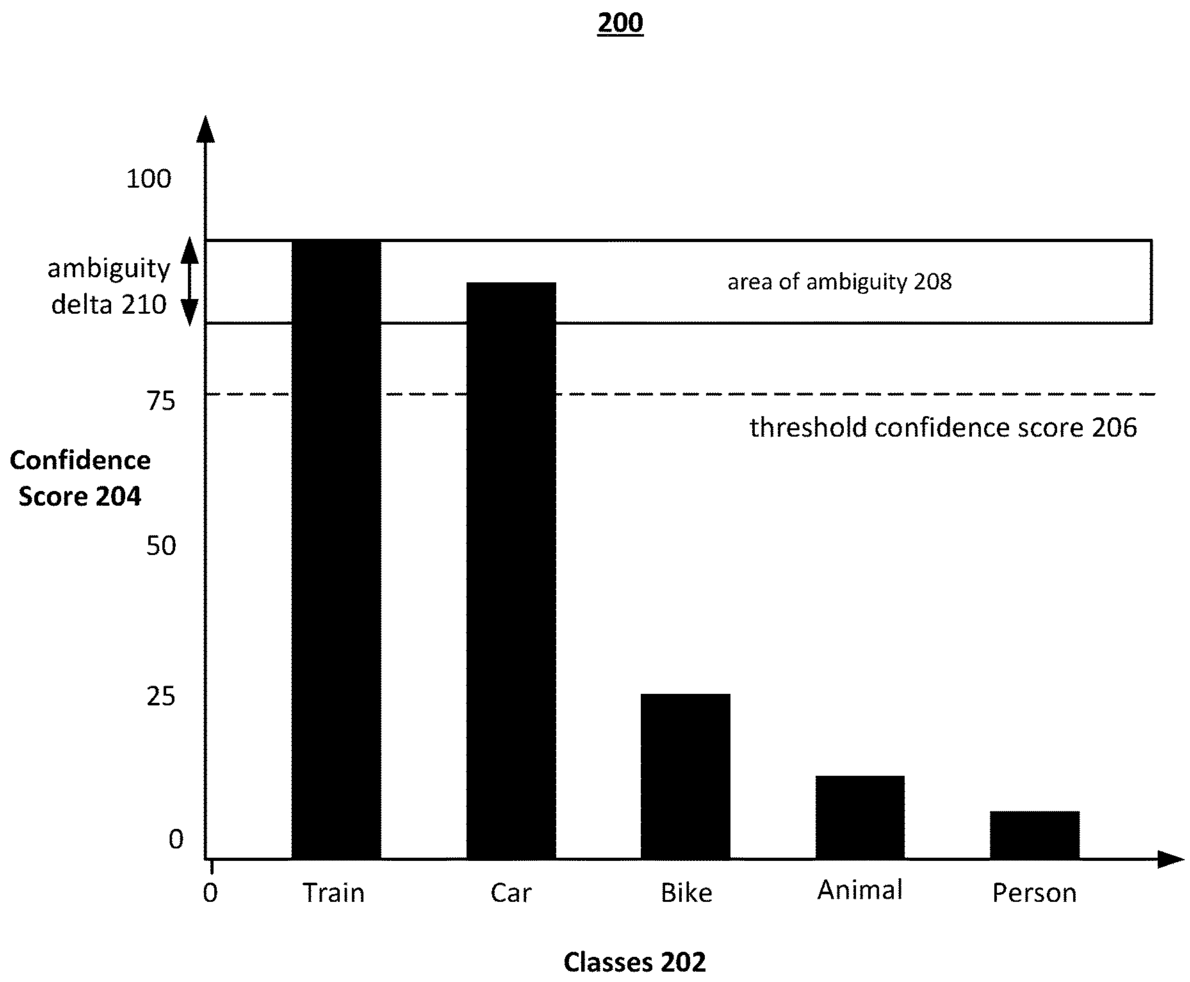
FIG. 2 is a graph of confidence scores for an example classification, in accordance with exemplary aspects of the present disclosure.

Referring to FIG. 2, a graph 200 of one example of confidence scores 204 versus classes 202 for an example classification of object 106 by the general OCM. In this example, the reason the general OCM may misclassify the object is because the confidence score of the class "train" is greater than the confidence score of the class "car"—both of which are greater than the threshold confidence score. Thus, because the general OCM determines that there are multiple candidate classes that are above the threshold confidence score 206, the present aspects may consider object 106 to be an ambiguous object, and may then initiate subsequent evaluation and classification using two or more single-class OCMs (e.g., in this example, a first single-class OCM specifically trained to detect trains, and a second single-class OCM specifically trained to detect cars) in order to determine the true class of the ambiguous object.

On a more technical level, in one aspect, the object classifier component considers any given object to be an ambiguous object when multiple confidence scores are within an area of ambiguity 208, as shown in FIG. 2. The area of ambiguity is a numerical range within which confidence scores may fall, requiring a subsequent classification evaluation. For instance, the numerical range in one case, such as the example illustrated in FIG. 2, is where the general OCM predicts two or more object classifications for the same object that are each above the threshold confidence score. Alternatively, in another example, the numerical range of the area of ambiguity is where the general OCM does not predict any object classification above the threshold confidence score—in this case the aspects may then initiate subsequent evaluation and classification using two or more single-class OCMs corresponding to the predicted classes with the highest two or more confidence scores. In any case, this subsequent classification evaluation is performed by single-class OCMs. For example, the object classifier component may input image frame 102*a* into a first OCM that determines whether an object in the image is a train. The object classifier component may also input image frame 102*a* into a second OCM that determines whether an object in the image is a car. Because the single-class OCMs are trained on a single-class dataset, their accuracy is greater than the general OCM.

The trade-off for greater accuracy is increased computation requirements. For example, while one may simply run an input image frame on each of the single-class OCMs and assign the class based on the highest confidence score output, running each model may be unnecessary (e.g., running a person classifier on an image of a train would likely result in an obvious output of "no person detected") and costly in terms of memory and processing requirements (e.g., running five classifiers in comparison to three classifiers in the example given above).

In an exemplary aspect to further improve ambiguous object classification, and which may reduce additional computation resources, the object classifier component may additionally extract image 108 from image frame 102*a*. Image 108 may be a cropped version of image frame 102*a* that solely focuses on the ambiguous object 106. As mentioned previously, each of the classified objects may be bounded by a classification boundary. The object classifier component may then crop the image to the boundary and input the cropped image into one or more single-class OCMs. This reduces computation by the single-class OCM because the single-class OCM is presented with a focused image without a plurality of other objects to process.

Figure 3:
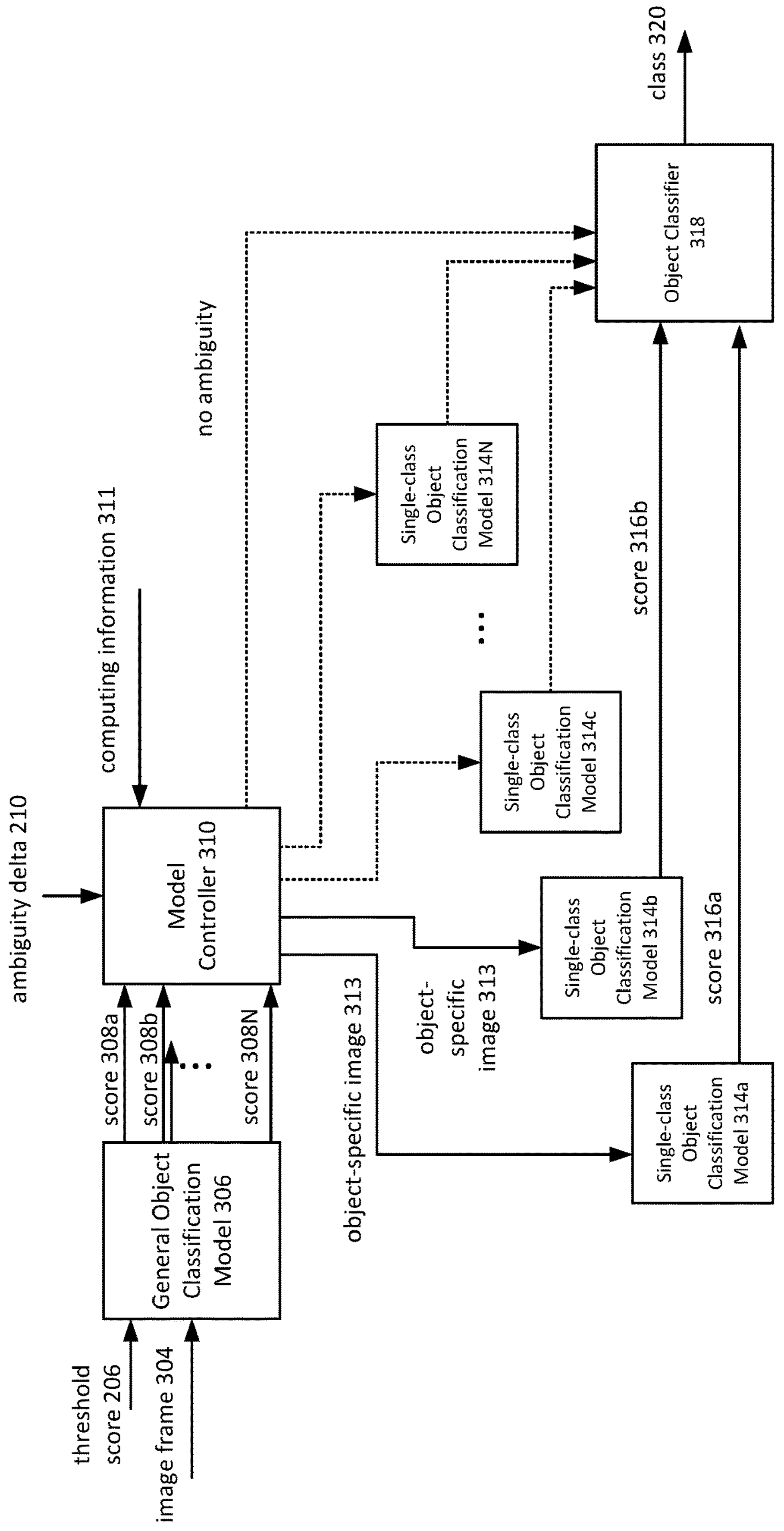
FIG. 3 is a diagram of model controller system, in accordance with exemplary aspects of the present disclosure.

Referring to FIG. 3, the object classifier component described in the present disclosure may include, in one example, a model controller system 300.

In one non-limiting example, an object classification sequence utilizing the model controller system 300 includes a computing device running general OCM 306 on image frame 304 (e.g., image frame 102*a*). General OCM 306 includes a threshold confidence score 206 that is used in the multi-class classification. General OCM 306 may output a confidence score (e.g., score 308*a*, 308*b*, . . . , 308N) for each class. Model controller 310, which is a decision-making engine, determines whether an ambiguous object is detected. In this example, model controller 310 uses ambiguity delta 210, which may be a preset value modifiable by a user, to determine whether multiple confidence scores signal that a subsequent classification evaluation is needed. Alternatively, it should be understood that in other examples, model controller 310 may use the area of ambiguity when the general OCM does not predict any object classification above the threshold confidence score, e.g., where subsequent evaluation and classification is then initiated using two or more single-class OCMs corresponding to the predicted classes with the highest two or more confidence scores.

Continuing with the example where model controller 310 uses ambiguity delta 210, the ambiguity delta 210 is a fixed percentage of confidence that is subtracted from the confidence score of the object class with the highest confidence to define an "area of ambiguity," as shown in FIG. 2. If the confidence score of only a single object class is within the area of ambiguity, then the object classification process is finished and the object with the highest confidence score is assigned to an object. In some cases, the model controller 310 additionally confirms that the confidence score of the single object class meets the threshold confidence score. However, if two or more confidence scores of candidate classes are within the area of ambiguity, then at least two object classes with the highest confidence scores will be selected by model controller 310, thereby indicating an ambiguous object. For example, ambiguity delta 210 may be 10%. Accordingly, model controller 310 may determine whether any confidence scores are within 10% from the highest confidence score. Referring to FIG. 2, if the confidence score associated with the class "train" is 90% and the confidence score associated with the class "car" is 86%, because the confidence score associated with the class "car" is within the 10% range (e.g., 80%-90%), model controller 310 determines that object 106 is an ambiguous object and that a subsequent classification evaluation will be necessary.

Model controller 310 may extract the object-specific image 313 from the original input image (e.g., extract image 108 from image frame 102*a*) and input the extracted image into each of the relevant single-class OCMs 314*a*, 314*b*, 314*c*, . . . , 314N, where "N" is an integer. The single-class OCMs 314*a*, 314*b*, 314*c*, . . . , 314N may output a single-class score 316*a*, 316*b*, etc., that indicates a likelihood of the ambiguous object being a member of their corresponding class. For example, single-class OCM 314*a* for classifying trains may output score 316*a* (e.g., 40%) and single-class OCM 314*b* for classifying cars may output score 316*b* (e.g., 90%). Object classifier 318 compares each of scores 316*a*, 316*b*, etc., and outputs class 320 associated with the highest score. For example, object classifier 318 may output the class "car" for object 106, which is the correct classification.

In some aspects, model controller 310 further receives computing information 311, which summarizes a computational state of the computing device running the OCMs, for use in managing subsequent classification evaluations. For example, computing information 311 may include CPU usage statistics, memory usage statistics, bandwidth availability information, network connection statistics, etc. Model controller 310 may determine, based on computing information 311, whether there is enough computing power to run multiple OCMs. For example, a user may provide a time constraint (e.g., 30 milliseconds) to model controller 310. This time constraint may be a limit for the amount of time the model controller system 300 has to produce an output class for each of the objects in a given input image frame. In some aspects, the time constraint is based on the rate at which the image frames are received. For example, if 15 frames are received per second, the model controller system 300 will have approximately 67 milliseconds to complete classification in order to maintain real-time evaluation. Model controller 310 may calculate, based on computing information 311, the amount of time it will take to execute each of the OCMs, which the model controller 310 may then use to determine how many single-class OCMs may be executed within the time constraint. Suppose that the general OCM 306 can be executed in 30 milliseconds and each single-class OCM 314*a*, 314*b*, etc., can be executed in 15 milliseconds. Based on a time constraint of 67 milliseconds, the model controller system will be able to run the general OCM 306 and up to two single-class OCMs 314*a*, 314*b*, etc.

In some aspects, when a time constraint only allows for fewer OCMs to be executed than actually needed in accordance with the ambiguity delta (e.g., there is only enough time to run the general OCM even though two additional single-class OCMs need to be run, or there is only enough time to run the general OCM and three single-class OCMs despite needing to run five single-class OCMs based on the ambiguity delta 210), model controller 310 may divide the computations across multiple frames. This is an effective approach because the changes between frames in high-frame rate streams may be minimal. For example, referring to FIGS. 1-2, if the time constraint is 30 milliseconds, the 30-millisecond general OCM may be applied on image frame 102*a*, and two 15-millisecond single-class OCMs may be applied using image frame 102*b*. In some aspects, the computing device employing the model controller system 300, or the model controller system 300 itself, may use object tracking to track the ambiguous object across multiple frames (e.g., between image frame 102*a* and image frame 102*b*) such that the image focused on the ambiguous object (e.g., image 108) may be extracted from subsequent frames.

Thus, the model controller system 300 is able to improve classification accuracy while minimizing the amount of processing required.

Figure 4:
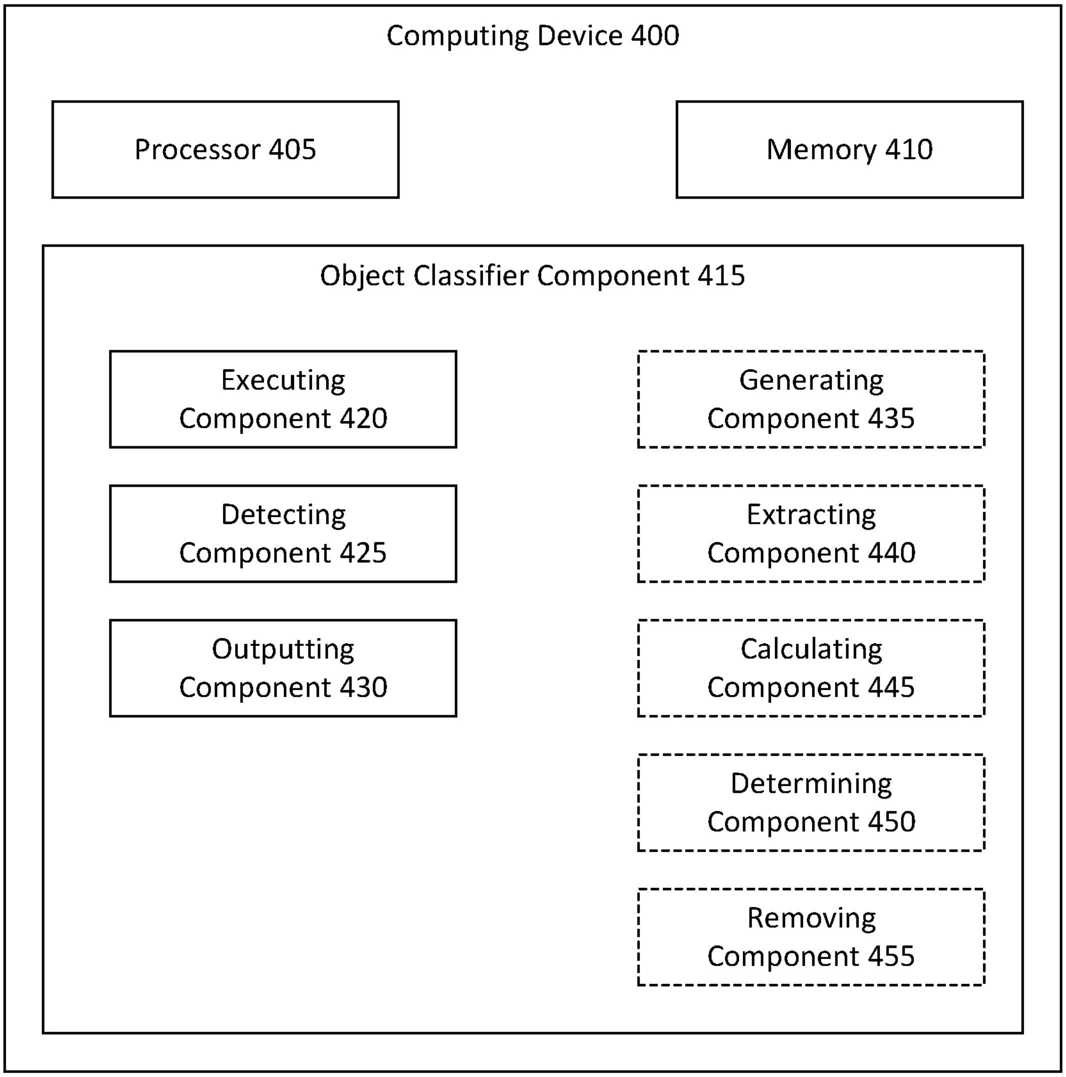
FIG. 4 is a block diagram of an example of a computer device having components configured to perform a method for object classification.
Figure 5:
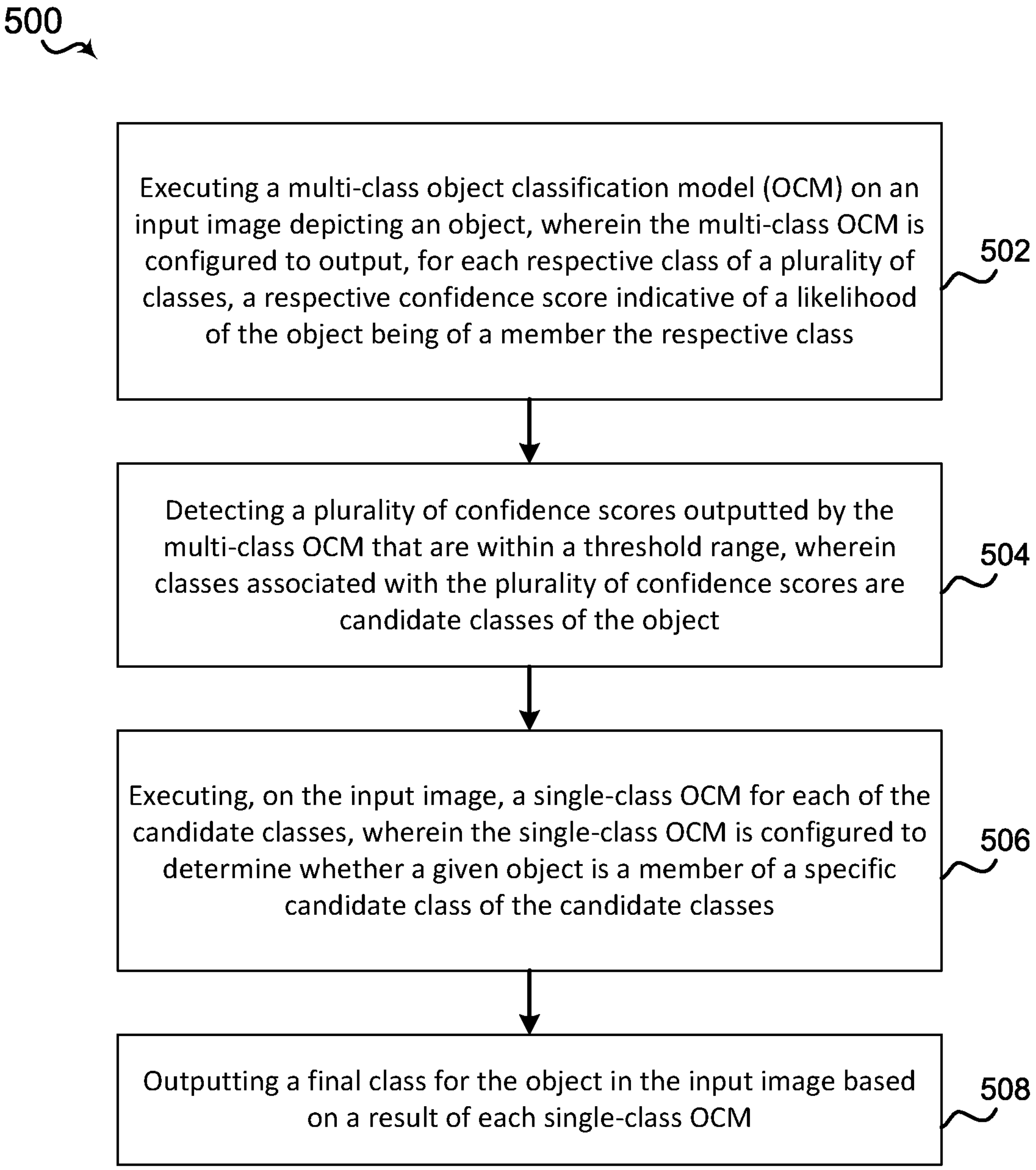
FIG. 5 is a flowchart of an example of a method for object classification.

Referring to FIG. 4 and FIG. 5, in operation, computing device 400 may perform a method 500 for object classification, such as via execution of object classifier component 415 by processor 405 and/or memory 410.

At block 502, the method 500 includes executing a multi-class OCM on an input image depicting an object, wherein the multi-class OCM is configured to output, for each respective class of a plurality of classes, a respective confidence score indicative of a likelihood of the object being of a member the respective class. For example, in an aspect, computing device 400, processor 405, memory 410, object classifier component 415, and/or executing component 420 may be configured to or may comprise means for executing a multi-class OCM (e.g., general OCM 306) on an input image (e.g., image frame 102*a*) depicting an object (e.g., object 106), wherein the multi-class OCM is configured to output, for each respective class of a plurality of classes (e.g., "train," "car," "bike," "animal," and "person" in FIG. 2), a respective confidence score indicative of a likelihood of the object being of a member the respective class.

For example, multi-class OCM may be a machine learning algorithm (e.g., a naïve bayes classifier) or a neural network (e.g., VGG-16) that receives image frame 102*a*, embeds the image into a vector representation, applies learned weighted vector(s) on the vector representation, and generates a plurality of confidence scores based on the application of weights. Consider the following exemplary confidence scores for the plurality of classes listed above: c1: 90%, c2: 85%, c3: 25% c4: 15%, and c5: 5%. This suggests that there is a 90% likelihood of object 106 being a train, an 85% likelihood of object 106 being a car, a 25% likelihood of object 106 being a bike, a 15% likelihood of object 106 being an animal, and a 5% likelihood of object 106 being a person.

At block 504, the method 500 includes detecting a plurality of confidence scores outputted by the multi-class OCM that are within a threshold range, wherein classes associated with the plurality of confidence scores are candidate classes of the object. For example, in an aspect, computing device 400, processor 405, memory 410, object classifier component 415, and/or detecting component 425 may be configured to or may comprise means for detecting a plurality of confidence scores outputted by the multi-class OCM that are within a threshold range (e.g., 5%), wherein classes associated with the plurality of confidence scores are candidate classes of the object. In this case, threshold range and ambiguity delta are used interchangeably.

In one aspect, detecting component 425 may compare each of the confidence scores and determine if confidence scores are within the threshold range (e.g., 5%) from one another. For example, confidence scores c1 and c2 are 5% apart, whereas all other combinations of confidence scores are at least 10% apart (which is greater than 5%). Based on this, detecting component 425 may identify classes "train" and "car" as candidate classes.

In some aspects, detecting component 425 may specifically confirm whether the plurality of confidence scores are each greater than a threshold confidence score. For example, the threshold confidence score may be 75% and represents the minimum score a class must be associated with in order to be considered as a possible class for an object. If a confidence score for a class is less than this value, detecting component 415 may disqualify the class as a candidate class. For example, if the confidence score for "car" is less than 75%, detecting component 415 may determine that only one candidate class exists and label that class as the true class of the object.

In some aspects, however, despite the confidence score of a class being less than the threshold confidence score, as long as it is in the threshold range of the highest confidence score, the class is kept as a candidate class. For example, the highest confidence score may be 90% for "train" and the confidence score for "car" may be 85%. If the threshold confidence score is 88%, in a conventional machine learning algorithm, "car" would be removed as a candidate class. However, because the proximity between the top two classes' confidence scores is within a threshold range such as 5%, the accuracy of the classification is still questionable. In other words, the object may actually be a car that is misclassified as a train. Accordingly, in an alternative or additional aspect, the threshold range is between a highest confidence score of the plurality of confidence scores and a lower confidence score that is a fixed amount (e.g., 5%) below the highest confidence score. As long as a class is associated with a confidence score within the threshold range, detecting component 425 identifies the class as a candidate class.

At block 506, the method 500 includes executing, on the input image, a single-class OCM for each of the candidate classes, wherein the single-class OCM is configured to determine whether a given object is a member of a specific candidate class of the candidate classes. For example, in an aspect, computing device 400, processor 405, memory 410, object classifier component 415, and/or executing component 425 may be configured to or may comprise means for executing, on the input image (e.g., image frame 102*a*), a single-class OCM for each of the candidate classes (e.g., single-class OCM 314*a* for class "train" and single-class OCM 314*b* for class "car"), wherein the single-class OCM is configured to determine whether a given object is a member of a specific candidate class of the candidate classes.

For example, single-class OCM 314*a* may be a machine learning algorithm or a neural network that is trained on a dataset including images of trains. Likewise, single-class OCM 314*b* may be a machine learning algorithm or neural network that is trained on a dataset of images of cars. Single-class OCM 314*a* may thus output a binary verdict ("yes") on whether an input image depicts a train, and may further output a confidence score of the binary verdict being accurate (e.g., 50%). Single-class OCM 314*b* may thus output a binary verdict ("yes") on whether an input image depicts a car, and may further output a confidence score of the binary verdict being accurate (e.g., "90").

At block 508, the method 500 includes outputting a final class for the object in the input image based on a result of each single-class OCM. For example, in an aspect, computing device 400, processor 405, memory 410, object classifier component 415, and/or outputting component 430 may be configured to or may comprise means for outputting a final class for the object in the input image based on a result of each single-class OCM.

In the event that both single-class OCMs indicate that the object is a member of their respective classes, the final class is selected based on the higher of the two confidence scores. In the example confidence scores given above, this would indicate that object 106 is a member of class "car." In some aspects, if both single OCMs indicate with high likelihood (e.g., above a secondary threshold confidence score) of an object being a member of their respective classes, the final class is outputted as a combination of the classes (e.g., "car or train").

Figure 6:
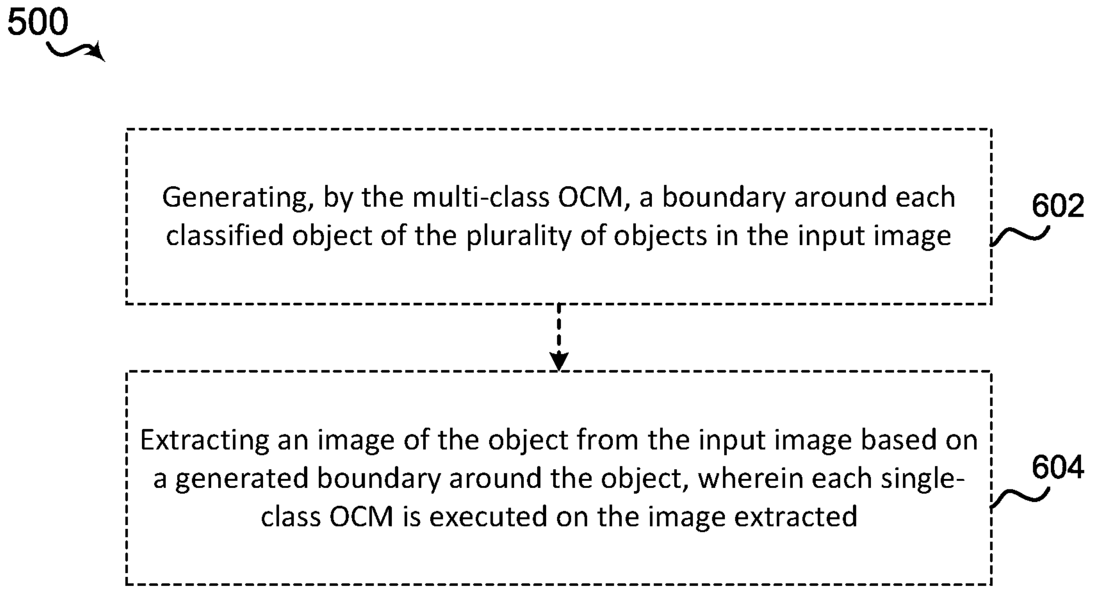
FIG. 6 is a flowchart of additional aspects of the method of FIG. 5.

Referring to FIG. 6, in an alternative or additional aspect wherein the input image comprises a plurality of objects, at block 602, the method 500 may further include generating, by the multi-class OCM, a boundary around each classified object of the plurality of objects in the input image. For example, in an aspect, computing device 400, processor 405, memory 410, object classifier component 415, and/or generating component 435 may be configured to or may comprise means for generating, by the multi-class OCM (e.g., general OCM 306), a boundary around each classified object of the plurality of objects in the input image (e.g., as shown in image frame 102*a* of FIG. 1).

In this optional aspect, at block 604, the method 500 may further include extracting an image of the object from the input image based on a generated boundary around the object, wherein each single-class OCM is executed on the image extracted. For example, in an aspect, computing device 400, processor 405, memory 410, object classifier component 415, and/or extracting component 440 may be configured to or may comprise means for extracting an image (e.g., image 108) of the object (e.g., object 106) from the input image (e.g., image frame 102*a*) based on a generated boundary around the object, wherein each single-class OCM is executed on the image extracted. For example, the single-class OCMs are applied on image 108 instead of image frame 102*a*. This reduces computation times because the single-class OCMs are given a smaller image with fewer objects in view.

Figure 7:
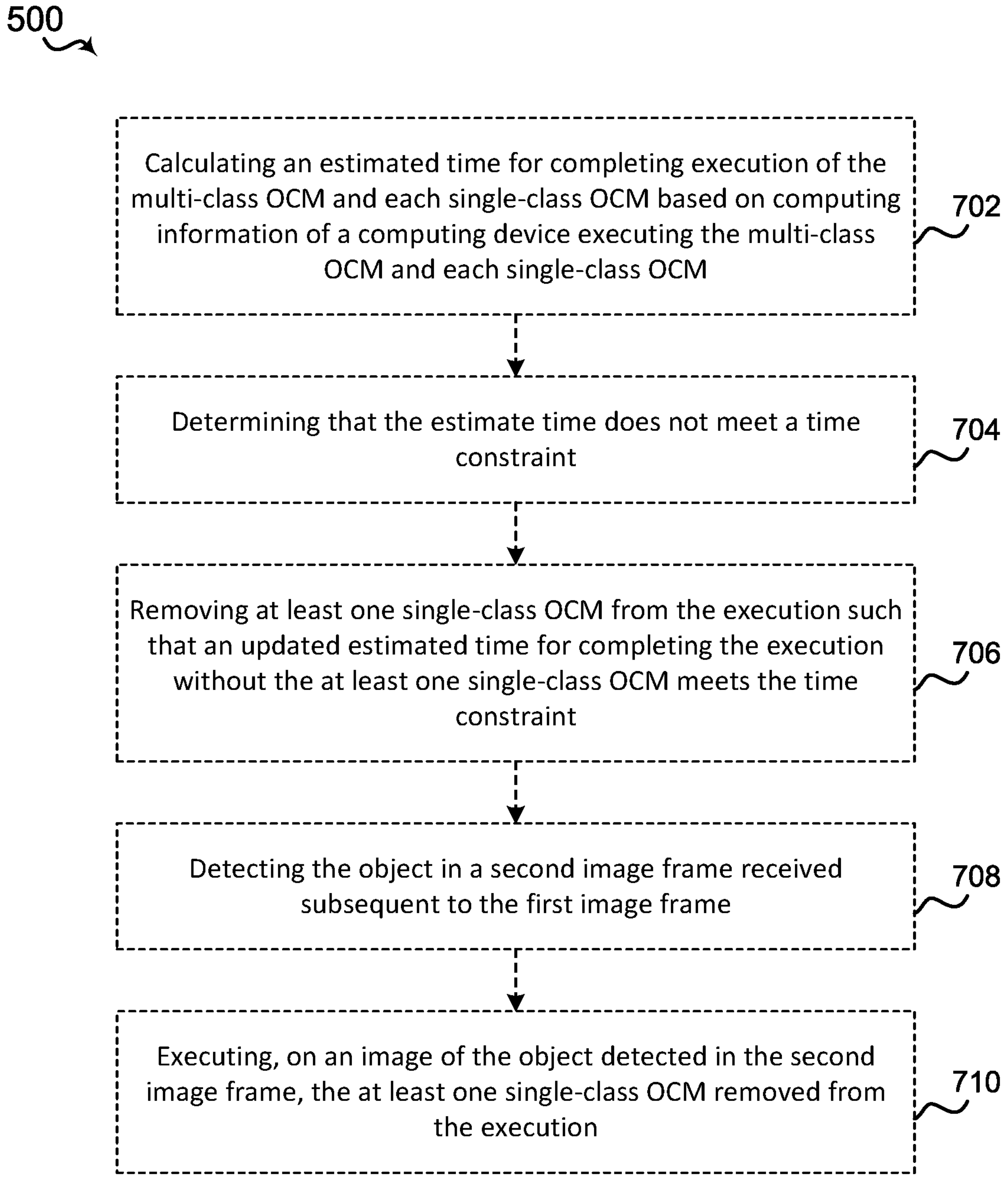
FIG. 7 is a flowchart of additional aspects of the method of FIG. 5.

Referring to FIG. 7, in an alternative or additional aspect, at block 702, the method 500 may further include calculating an estimated time for completing execution of the multi-class OCM and each single-class OCM based on computing information of a computing device executing the multi-class OCM and each single-class OCM. For example, in an aspect, computing device 400, processor 405, memory 410, object classifier component 415, and/or calculating component 445 may be configured to or may comprise means for calculating an estimated time for completing execution of the multi-class OCM (e.g., general OCM 306) and each single-class OCM (e.g., single-class OCMs 314*a*, 314*b*, etc.) based on computing information (e.g., computing information 311) of a computing device executing the multi-class OCM and each single-class OCM.

For example, the computing information may include information about memory usage (e.g., available random access memory (RAM), storage capacity, etc.), processor usage (e.g., CPU usage rate), and network usage (e.g., available bandwidth, upload/download speeds, etc.) for a given computing device. Calculating component 445 may execute a time-estimation formula that is function of the computing information, a size of the image, and an average runtime of the OCMs.

In this optional aspect, at block 704, the method 500 may further include determining that the estimate time does not meet a time constraint. For example, in an aspect, computing device 400, processor 405, memory 410, object classifier component 415, and/or determining component 450 may be configured to or may comprise means for determining that the estimate time does not meet a time constraint.

The time constraint represents the maximum allowable runtime for executing a combination of OCMs per image. For example, a user or developer may set the time constraint to 30 milliseconds.

Suppose that the general OCM has an estimate time to execute of 20 milliseconds as calculated by calculating component 445. Calculating component 445 may further determine that each single-class OCM has an estimate time of 10 milliseconds. It should be noted that each single-class OCM may be a different type of machine learning algorithm. Thus, each estimate time of execution for the single-class OCMs may be different. For simplicity, the examples provided in the present disclosure set the estimated time for each single-class OCM as the same. In order to run general OCM 306 and two single-class OCMs 314*a* and 314*b*, the total estimated time for execution is 40 milliseconds, which exceeds the time constraint.

In this optional aspect, at block 706, the method 500 may further include removing at least one single-class OCM from the execution such that an updated estimated time for completing the execution without the at least one single-class OCM meets the time constraint. For example, in an aspect, computing device 400, processor 405, memory 410, object classifier component 415, and/or removing component 455 may be configured to or may comprise means for removing at least one single-class OCM (e.g., single-class OCM 314*b*) from the execution such that an updated estimated time for completing the execution without the at least one single-class OCM meets the time constraint.

For example, removing single-class OCM 314*b* from the execution for image frame 102*a* reduces the total estimate time to 30 milliseconds, which meets the time constraint. In some aspects, if single-class OCM 314*a* indicates that the object is a member of its corresponding class with a confidence score greater than a threshold confidence score (which may be specific to the single-class OCM), object classifier component 415 may simply set that class (e.g., train) as the final class because single-class OCM 314*a* has been removed from the execution. This concludes the method.

However, in an optional aspect, where the input image is a first image frame of a video stream, the method 500 may further include at block 708, detecting the object (e.g., object 106) in a second image frame (e.g., image frame 102*b*) received subsequent to the first image frame (e.g., image frame 102*a*). For example, in an aspect, computing device 400, processor 405, memory 410, object classifier component 415, and/or detecting component 425 may be configured to or may comprise means for detecting the object in a second image frame received subsequent to the first image frame. For example, object classifier component 415 may search for (using computer vision techniques such as key-point detection) an object in the subsequent frame 102*b* that matches image 108 (i.e., the extracted image of object 106).

In this optional aspect, at block 710, the method 500 may further include executing, on an image of the object detected in the second image frame, the at least one single-class OCM removed from the execution. For example, in an aspect, computing device 400, processor 405, memory 410, object classifier component 415, and/or executing component 420 may be configured to or may comprise means for executing, on an image of the object detected in the second image frame (e.g., an image resembling or matching image 108 in image frame 102*b*), the at least one single-class OCM removed from the execution (e.g., single-class OCM 314*b*). In some aspects, the general OCM is not executed on image frame 102*b* in order to ensure that the time constraint is met to run the removed single-class OCM 314*b*. This technique of "forwarding" the execution to subsequent frames based on the time constraint is applicable even if more than two single-OCMs need to be executed. For example, if six single-class OCMs need to be executed for image frame 102*a* and each requires 10 milliseconds, object classifier component 415 may execute the general OCM and one single-class OCM using image frame 102*a*, three single-class OCMs using image frame 102*b*, and two single-class OCMs using image frame 102*c*. The results from each execution is then collected and compared to determine the final class of the object 106 detected in image frame 102*a*.

Additional aspects of the present disclosure may be implemented according to one or more of the following clauses.

Clause 1. A method for object classification, comprising: executing a multi-class object classification model (OCM) on an input image depicting an object, wherein the multi-class OCM is configured to output, for each respective class of a plurality of classes, a respective confidence score indicative of a likelihood of the object being of a member the respective class; detecting a plurality of confidence scores outputted by the multi-class OCM that are within a threshold range, wherein classes associated with the plurality of confidence scores are candidate classes of the object; executing, on the input image, a single-class OCM for each of the candidate classes, wherein the single-class OCM is configured to determine whether a given object is a member of a specific candidate class of the candidate classes; and outputting a final class for the object in the input image based on a result of each single-class OCM.

Clause 2. The method of any of the preceding clauses, wherein the plurality of confidence scores are each greater than a threshold confidence score.

Clause 3. The method of any of the preceding clauses, wherein the threshold range is between a highest confidence score of the plurality of confidence scores and a lower confidence score that is a fixed amount below the highest confidence score.

Clause 4. The method of any of the preceding clauses, wherein the input image comprises a plurality of objects, further comprising: generating, by the multi-class OCM, a boundary around each classified object of the plurality of objects in the input image.

Clause 5. The method of any of the preceding clauses, further comprising: extracting an image of the object from the input image based on a generated boundary around the object, wherein each single-class OCM is executed on the image extracted.

Clause 6. The method of any of the preceding clauses, further comprising: calculating an estimated time for completing execution of the multi-class OCM and each single-class OCM based on computing information of a computing device executing the multi-class OCM and each single-class OCM; determining that the estimate time does not meet a time constraint; and removing at least one single-class OCM from the execution such that an updated estimated time for completing the execution without the at least one single-class OCM meets the time constraint.

Clause 7. The method of any of the preceding clauses, wherein the input image is a first image frame of a video stream, further comprising:

detecting the object in a second image frame received subsequent to the first image frame; and executing, on an image of the object detected in the second image frame, the at least one single-class OCM removed from the execution.

Clause 8. The method of any of the preceding clauses, wherein the time constraint is based on a frame rate of the video stream.

Clause 9. An apparatus for object classification, comprising: a memory; and a processor coupled with the memory and configured to: execute a multi-class object classification model (OCM) on an input image depicting an object, wherein the multi-class OCM is configured to output, for each respective class of a plurality of classes, a respective confidence score indicative of a likelihood of the object being of a member the respective class; detect a plurality of confidence scores outputted by the multi-class OCM that are within a threshold range, wherein classes associated with the plurality of confidence scores are candidate classes of the object; execute, on the input image, a single-class OCM for each of the candidate classes, wherein the single-class OCM is configured to determine whether a given object is a member of a specific candidate class of the candidate classes; and output a final class for the object in the input image based on a result of each single-class OCM.

Clause 10. The apparatus of any of the preceding clauses, wherein the plurality of confidence scores are each greater than a threshold confidence score.

Clause 11. The apparatus of any of the preceding clauses, wherein the threshold range is between a highest confidence score of the plurality of confidence scores and a lower confidence score that is a fixed amount below the highest confidence score.

Clause 12. The apparatus of any of the preceding clauses, wherein the input image comprises a plurality of objects, wherein the processor is further configured to: generate, by the multi-class OCM, a boundary around each classified object of the plurality of objects in the input image.

Clause 13. The apparatus of any of the preceding clauses, wherein the processor is further configured to: extract an image of the object from the input image based on a generated boundary around the object, wherein each single-class OCM is executed on the image extracted.

Clause 14. The apparatus of any of the preceding clauses, wherein the processor is further configured to: calculate an estimated time for completing execution of the multi-class OCM and each single-class OCM based on computing information of a computing device executing the multi-class OCM and each single-class OCM; determine that the estimate time does not meet a time constraint; and remove at least one single-class OCM from the execution such that an updated estimated time for completing the execution without the at least one single-class OCM meets the time constraint.

Clause 15. The apparatus of any of the preceding clauses, wherein the input image is a first image frame of a video stream, wherein the processor is further configured to: detect the object in a second image frame received subsequent to the first image frame; and execute, on an image of the object detected in the second image frame, the at least one single-class OCM removed from the execution.

Clause 16. The apparatus of any of the preceding clauses, wherein the time constraint is based on a frame rate of the video stream.

Clause 17. A computer-readable medium having instructions stored thereon for object classification, wherein the instructions are executable by a processor to: execute a multi-class object classification model (OCM) on an input image depicting an object, wherein the multi-class OCM is configured to output, for each respective class of a plurality of classes, a respective confidence score indicative of a likelihood of the object being of a member the respective class; detect a plurality of confidence scores outputted by the multi-class OCM that are within a threshold range, wherein classes associated with the plurality of confidence scores are candidate classes of the object; execute, on the input image, a single-class OCM for each of the candidate classes, wherein the single-class OCM is configured to determine whether a given object is a member of a specific candidate class of the candidate classes; and output a final class for the object in the input image based on a result of each single-class OCM.

While the foregoing discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for object classification, comprising:

executing, on a computing device, a multi-class object classification model (OCM) on an input image depicting an object, wherein the multi-class OCM is configured to output, for each respective class of a plurality of classes, a respective confidence score indicative of a likelihood of the object being of a member the respective class;

detecting a plurality of confidence scores outputted by the multi-class OCM that are within a threshold range from one another, wherein classes associated with the plurality of confidence scores are candidate classes of the object;

calculating an estimated time for completing execution of the multi-class OCM and a single-class OCM for each of the candidate classes based on computing information of the computing device;

determining that the estimate time does not meet a time constraint;

removing at least one single-class OCM from the execution such that an updated estimated time for completing the execution without the at least one single-class OCM meets the time constraint;

executing, on the input image, a single-class OCM for each of the candidate classes except the at least one single-class OCM removed from the execution, wherein each respective single-class OCM is configured to evaluate membership of the object in a specific candidate class of the candidate classes that the respective single-class OCM is trained to detect; and outputting a final class for the object in the input image based on a result of each single-class OCM.

2. The method of claim 1, wherein the plurality of confidence scores are each greater than a threshold confidence score.

3. The method of claim 1, wherein the threshold range is between a highest confidence score of the plurality of confidence scores and a lower confidence score that is a fixed amount below the highest confidence score.

4. The method of claim 1, wherein the input image comprises a plurality of objects, further comprising:

generating, by the multi-class OCM, a boundary around each classified object of the plurality of objects in the input image.

5. The method of claim 4, further comprising:

extracting an image of the object from the input image based on a generated boundary around the object, wherein each single-class OCM is executed on the image extracted.

6. The method of claim 1, wherein the input image is a first image frame of a video stream, further comprising:

detecting the object in a second image frame received subsequent to the first image frame; and executing, on an image of the object detected in the second image frame, the at least one single-class OCM removed from the execution.

7. The method of claim 6, wherein the time constraint is based on a frame rate of the video stream.

8. An apparatus for object classification, comprising:

a memory; and a processor coupled with the memory and configured to:

execute, on a computing device, a multi-class object classification model (OCM) on an input image depicting an object, wherein the multi-class OCM is configured to output, for each respective class of a plurality of classes, a respective confidence score indicative of a likelihood of the object being of a member the respective class;

detect a plurality of confidence scores outputted by the multi-class OCM that are within a threshold range from one another, wherein classes associated with the plurality of confidence scores are candidate classes of the object;

calculate an estimated time for completing execution of the multi-class OCM and a single-class OCM for each of the candidate classes based on computing information of the computing device;

determine that the estimate time does not meet a time constraint;

remove at least one single-class OCM from the execution such that an updated estimated time for completing the execution without the at least one single-class OCM meets the time constraint;

execute, on the input image, a single-class OCM for each of the candidate classes except the at least one single-class OCM removed from the execution, wherein each respective single-class OCM is configured to evaluate membership of the object in a specific candidate class of the candidate classes that the respective single-class OCM is trained to detect; and output a final class for the object in the input image based on a result of each single-class OCM.

9. The apparatus of claim 8, wherein the plurality of confidence scores are each greater than a threshold confidence score.

10. The apparatus of claim 8, wherein the threshold range is between a highest confidence score of the plurality of confidence scores and a lower confidence score that is a fixed amount below the highest confidence score.

11. The apparatus of claim 8, wherein the input image comprises a plurality of objects, wherein the processor is further configured to:

generate, by the multi-class OCM, a boundary around each classified object of the plurality of objects in the input image.

12. The apparatus of claim 11, wherein the processor is further configured to:

extract an image of the object from the input image based on a generated boundary around the object, wherein each single-class OCM is executed on the image extracted.

13. The apparatus of claim 8, wherein the input image is a first image frame of a video stream, wherein the processor is further configured to:

detect the object in a second image frame received subsequent to the first image frame; and execute, on an image of the object detected in the second image frame, the at least one single-class OCM removed from the execution.

14. The apparatus of claim 13, wherein the time constraint is based on a frame rate of the video stream.

15. A non-transitory computer-readable medium having instructions stored thereon for object classification, wherein the instructions are executable by a processor to:

execute, on a computing device, a multi-class object classification model (OCM) on an input image depicting an object, wherein the multi-class OCM is configured to output, for each respective class of a plurality of classes, a respective confidence score indicative of a likelihood of the object being of a member the respective class;

detect a plurality of confidence scores outputted by the multi-class OCM that are within a threshold range from one another, wherein classes associated with the plurality of confidence scores are candidate classes of the object;

calculate an estimated time for completing execution of the multi-class OCM and a single-class OCM for each of the candidate classes based on computing information of the computing device;

determine that the estimate time does not meet a time constraint;

remove at least one single-class OCM from the execution such that an updated estimated time for completing the execution without the at least one single-class OCM meets the time constraint;

execute, on the input image, a single-class OCM for each of the candidate classes except the at least one single-class OCM removed from the execution, wherein each respective single-class OCM is configured to evaluate membership of the object in a specific candidate class of the candidate classes that the respective single-class OCM is trained to detect; and output a final class for the object in the input image based on a result of each single-class OCM.

* * * * *